Apr. 24, 1923.
C. H. WACK
CLEAT FOR ELECTRIC CONDUITS
Filed July 13, 1921
1,452,993
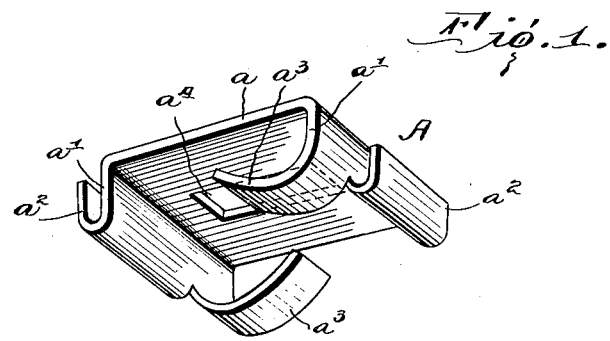
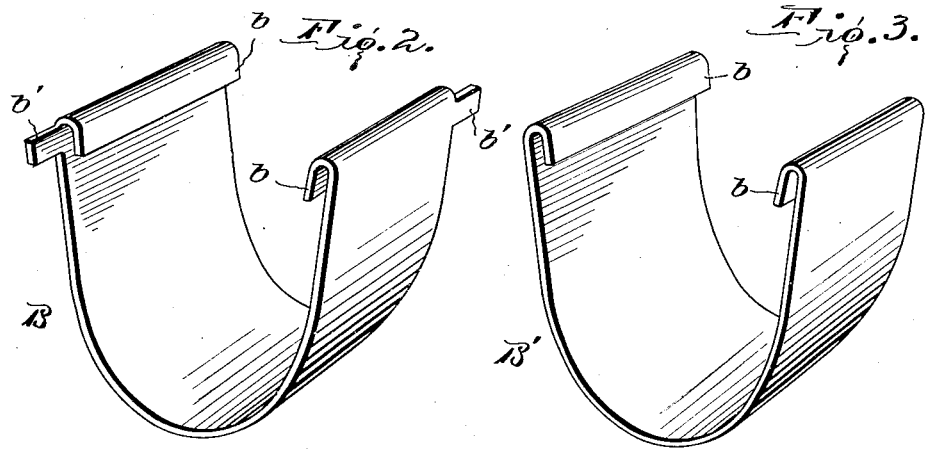
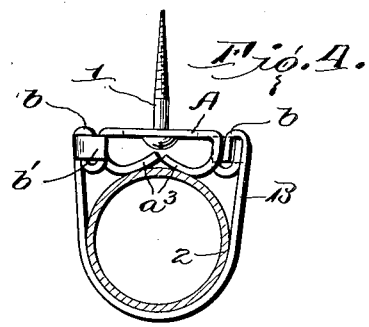
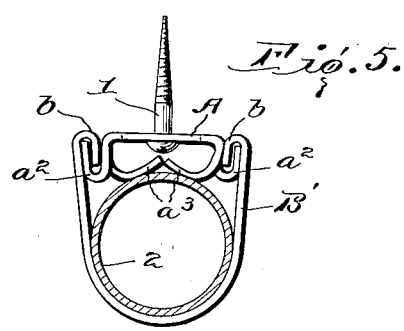
Inventor
C. H. Wack.
By Robert Watson
Attorney Patented Apr. 24, 1923.

1,452,993

UNITED STATES PATENT OFFICE.

CHARLES H. WACK, OF BALTIMORE, MARYLAND.

CLEAT FOR ELECTRIC CONDUITS.

Application filed July 13, 1921. Serial No. 484,306.

*To all whom it may concern:*

Be it known that I, CHARLES H. WACK, a citizen of the United States, residing at Baltimore, in the State of Maryland, have invented certain new and useful Improvements in Cleats for Electric Conduits, of which the following is a specification.

This invention relates to a sheet metal cleat adapted particularly for securing conduits for electric wires to walls or ceilings. In carrying out the invention I provide a base piece having flanges at opposite sides, one part of each flange being outwardly turned to form a hook and the other part being inwardly turned to serve as a support for the conduit. The inwardly turned parts are at opposite ends of the base, to lengthen the support, and the outwardly turned parts are at opposite ends of the base to lengthen the hook engagement with a metal strap which is adapted to extend over the conduit and is provided with inwardly turned ends adapted to engage the hooked portions of the base. In one form of the invention I provide tangs on one part of the cleat for locking the strap to the base.

In the accompanying drawing:

Fig. 1 is a front perspective view of the base of the cleat,

Fig. 2 is a perspective view of a strap for engaging the base and having tangs for locking the parts together, Fig. 3 is a perspective view of a strap, the same as that shown in Fig. 2, but with the tangs omitted, Fig. 4 is an end view of a cleat with a strap like that shown in Fig. 2, assembled about a conduit, and Fig. 5 is a similar view of a cleat having a strap like that shown in Fig. 3, assembled about a conduit.

Referring to the drawing A indicates the base of the cleat, composed of sheet metal and comprising a flat rectangular body portion $a$ having up-turned flanges $a'$ at its opposite sides. These flanges are split on transverse lines to provide relatively wide tongues which are bent outwardly to form hooked portions $a^2$ and relatively narrow tongues which are bent inwardly to form supports $a^3$ for a conduit. The hooks $a^2$ are at opposite ends of the flanges and likewise, the supports $a^3$ are at opposite ends of the flanges. The supports $a^3$ curve gradually inwardly toward the bottom along its central line and form a sort of cradle against which the pipe 2 rests, as shown in Figs. 4 and 5. The central part of the body is provided with an opening $a^4$ to receive a screw 1 for attaching the base to a wall or ceiling, and this opening is in the form of a slot extending transversely of the base to permit of lateral adjustment of the base with respect to the attaching screw.

The strap B, shown in Figs. 2 and 4, comprises a piece of sheet metal bent into U form, as shown, and having its ends doubled inwardly to form hooks $b$ for engaging the hooks on the base. On opposite edges of the strap B, adjacent the inturned ends, are integral tangs $b'$ which may be bent over at right angles when the parts are assembled, to prevent the strap from sliding with respect to the base. The same result might be attained by providing tangs on the flanges of the base instead of on the strap, but I prefer to have them on the strap. The strap B', in Fig. 3, is the same as the strap shown in Fig. 2, except that the tangs are omitted.

The manner of assembling and using the cleat will be clear from Figs. 4 and 5. The bases of any desired number of cleats are attached to the wall or ceiling of a room along the line which it is intended to have the conduit follow. A section of conduit is then placed against the inturned supports on the bases and the straps are placed astride the conduit and pushed lengthwise thereover until the hooks on each strap engage the hooks on a base piece for its full length. Where the pipe or conduit extends horizontally, there is no necessity for using the strap with tangs, but where the conduit extends vertically it may be desirable to use the strap with tangs, and to bend these inwardly across the ends of the hooks on the base, as shown in Fig. 4, to prevent the strap from sliding out of engagement with the base. Should any of the bases be slightly out of line with the pipe when the latter is laid against the supports on the bases, these bases which are out of line, may be adjusted slightly into line by loosening the attaching screws and adjusting the bases laterally, the slots in the bases permitting of such adjustment.

The junction boxes used in house-wiring systems are provided with openings in their sides for receiving the ends of the conduits or with circular pieces which may be knocked out of their sides to provide openings for the ends of the conduits, and these openings are spaced a short distance from the bottoms of the boxes. The inwardly turned supports on the base of my cleat support the conduit out of engagement with the wall or ceiling and at the same distance from the wall or ceiling as the holes in the standard junction boxes, so that the conduits may be extended into the junction boxes without difficulty.

What I claim is:

1. A cleat for supporting conduits comprising a base piece having flanges at its opposite edges projecting at the same side of the base-piece, each flange comprising a part bent outwardly to form a hook and a part bent inwardly over the base to form a support for the conduit, and a U-shaped strap having inwardly bent hooked portions at its ends adapted to engage the hooked portions on the base.

2. A cleat for supporting conduits comprising a base piece having a transversely elongated opening at its center and having flanges at its opposite edges projecting at the same side of the base-piece, each flange comprising a part bent outwardly to form a hook and a part bent inwardly over the base to form a support for the conduit, and a U-shaped strap having inwardly bent hooked portions at its ends adapted to engage the hooked portions on the base.

3. A cleat for supporting conduits comprising a base piece having side flanges, each flange having a part bent outwardly to form a hook and a part bent inwardly to form a support for the conduit, and a U-shaped strap having inwardly bent hooked portions at its ends adapted to engage the hooked portions on the base, one part of the cleat having tangs at its edges adapted to extend across the ends of the hooked portions of the other part.

4. A cleat for supporting conduits comprising a base piece having side flanges, each flange having a part bent outwardly to form a hook and a part bent inwardly to form a support for the conduit, and a U-shaped strap having inwardly bent hooked portions at its ends adapted to engage the hooked portions on the base and having laterally projecting tangs adapted to extend over the ends of said flanges to lock the strap to the base.

In testimony whereof I affix my signature.

CHARLES H. WACK.